United States Patent Office 3,549,612
Patented Dec. 22, 1970

3,549,612
CATIONIC ARYL MONOAZO AND DISAZO-
3 - SUBSTITUTED - 1 - AMINOMETHYLPY-
RAZOLONE DYES
Ray Allen Clarke, Pitman, N.J., assignor to E. I. du Pont
de Nemours and Company, Wilmington, Del., a corporation of Delaware
No Drawing. Filed Nov. 6, 1967, Ser. No. 680,994
Int. Cl. C07c *107/04;* C09b *29/38, 31/14*
U.S. Cl. 260—160
9 Claims

ABSTRACT OF THE DISCLOSURE

Cationic aryl monoazo and disazo - 3 - substituted - 1-aminomethylpyrazolones, for example,

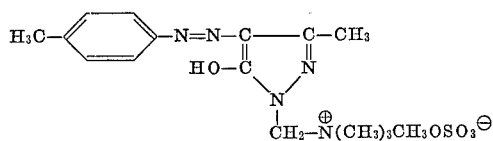

useful as dyes for acid modified acrylic, polyamide and polyester fibers, and having good water solubility, lightfastness, levelness, heat and pH stability and compatibility with other cationic dyes.

BACKGROUND OF THE INVENTION

(1) Field of the invention

This invention relates to novel cationic, aryl monoazo and disazo, 3-substituted-1-aminomethylpyrazolone dyes.

(2) Description of the prior art

Cationic dyes are especially useful for dyeing and printing acid-modified polyacrylonitrile, acid-modified polyethylene terephthalate, and acid-modified polyamide fibers. In order to be commercially attractive a cationic dye should be inexpensive, have good lightfastness, good buildup, good dye-bath and dry heat stability, good level dyeing characteristics, good solubility, and be essentially nonstaining to cotton, wool, unmodified polyethylene terephthalate, etc.

There is no cationic yellow dye which possesses all of these characteristics to the desired degree. Even the most widely used cationic, yellow dye in present commercial practice possesses some drawbacks, which illustrate the many subtle characteristics of importance in today's sophisticated dye market. This important dye, for example, blocks the adsorption of a number of blue dyes, which renders this dye unsuitable for the common practice of dyeing shades from dye mixes which contain blue dyes. Although this dye is a bright yellow in low concentrations, on increasing dye depth it builds dull, rather than on tone. Accordingly, it would be desirable to provide cationic dyes in the yellow region for use with acid-modified synthetic fibers which possess the general characteristics of this widely used cationic yellow dye, but which do not block the adsorption of other dyes or build-up dull.

SUMMARY OF THE INVENTION

It has now been discovered that certain cationic, aryl monoazo and disazo, 3-substituted-1-aminomethylpyrazolone dyes possess all the desirable qualities required by the present market for cationic dyes. The novel dyes of this invention are cationic dyes of the structure:

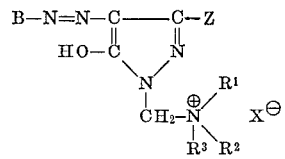

wherein B is Ar or Ar—N=N—Ar' in which
Ar is a phenyl or naphthyl group which is substituted with 0 to 3 substituents selected from the group consisting of Cl, Br, NO$_2$, CN, alkyl, alkoxy, CF$_3$, phenylcarbonyl, phenylsulfonyl, N,N-di- alkyl carboxamido and N,N - di - alkylsulfonamido; and
Ar' phenylene, naphthylene or biphenylylene, which is substituted with 0 to 2 substituents selected from consisting of alkyl and alkoxy groups;
Z is —CH$_3$ or

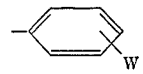

in which W is H, Cl, Br, NO$_2$ alkyl or C$_{1-4}$ alkoxy and is in the meta or para position;
R$^1$ and R$^2$ are alkyl or together with the attached nitrogen form an alicyclic ring of the structure

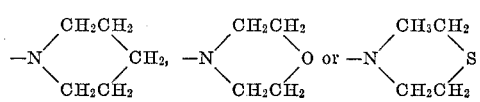

R$_3$ is alkyl or

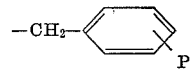

in which P is H, Cl, Br, NO$_2$, alkyl or C$_{1-4}$ alkoxy;
X is Cl, Br, alkylsulfate, HSO$_4$ or

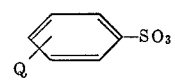

in which Q is H, alkyl or C$_{1-4}$ alkoxy.

The terms "alkyl" and "alkoxy," as employed above and throughout this specification in the definitions of "Ar," "Ar'," "W," "R$^1$," "R$^2$," "R$^3$," "P," "X" and "Q," refer to such groups having 1 to 4 carbon atoms.
Particularly preferred are of the structure:

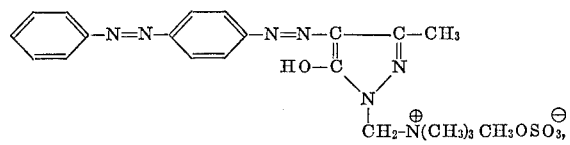

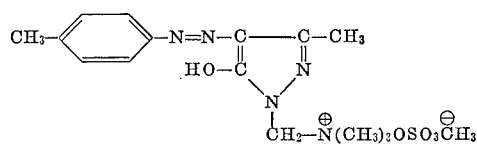

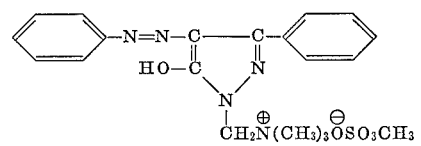

$$\text{CH}_3-\underset{\text{CH}_3}{\overset{\text{CH}_2}{\bigcirc}}-\text{N}=\text{N}-\underset{\text{HO}-\text{C}}{\text{C}}\underset{\underset{\overset{|}{\text{CH}_2\overset{\oplus}{\text{N}}(\text{CH}_3)_3\overset{\ominus}{\text{OSO}_3\text{CH}_3}}}{\text{N}}}{\overset{\text{C}-\text{CH}_3}{\diagdown}}\overset{\diagup}{\text{N}}$$

DESCRIPTION OF THE INVENTION

The cationic dyes of this invention are useful for dyeing and printing acid-modified fibers, particularly acid-modified polyacrylic fibers. The dyes of this invention provide good value to the trade since they exhibit excellent buildup at a very economical price due to the relatively simple process by which they are prepared from readily available inexpensive intermediates. In addition to the excellent value exhibited by these dyes, they also display good lightfastness, dyebath pH stability, high temperature dyeing stability, dry heat stability, steaming stability, stripping qualities, fastness to durable press treatments, absence of flare and are essentially non-staining on wool, cotton, unmodified polyethylene terephthalate, etc. Moreover, the inventive dyes are level dyeing and have good water solubility, particularly when considering some of the larger structures included in the dyes of this invention. A further advantage exhibited by the inventive dyes is their compatibility with co-applied cationic dyes, that is, they do not block or retard dyeing with other added dyes, and their characteristics of building-up to bright, deep shades rather than dulling.

(1) Preparation of the dyes

The process for preparing the novel dyes of this invention is simple and economical. The preparation involves the following steps:

(a) Diazotizing an aryl amine, B—NH$_2$, with NaNO$_2$ and a mineral acid, HX' to form a diazo, B—N$_2^\oplus$X'$^\ominus$ (b) Coupling the diazo to a pyrazolone, $$\begin{array}{c}\text{H}_2\text{C}\text{---}\text{C}-\text{Z}\\ \text{O}=\text{C}\diagdown\diagup\text{N}\\ \text{N}\\ |\\ \text{H}\end{array}$$

to form an azo pyrazolone, $$\begin{array}{c}\text{B}-\text{N}=\text{N}-\text{C}\text{---}\text{C}-\text{Z}\\ \text{HO}-\text{C}\diagdown\diagup\text{N}\\ \text{N}\\ |\\ \text{H}\end{array}$$

(c) Reacting the azo pyrazolone with formaldehyde and a secondary amine, R$^1$—NH—R$^2$, to form a dye base, $$\begin{array}{c}\text{B}-\text{N}=\text{N}-\text{C}\text{---}\text{C}-\text{Z}\\ \text{HO}-\text{C}\diagdown\diagup\text{N}\\ \text{C}\\ |\\ \text{CH}_2-\text{N}\diagdown\underset{\text{R}^2}{\text{R}^1}\end{array}$$

(d) Quaternizing the dye base with a quaternizing reagent, R$^3$—X, to yield a cationic dye, $$\begin{array}{c}\text{B}-\text{N}=\text{N}-\text{C}\text{---}\text{C}-\text{Z}\\ \text{HO}-\text{C}\diagdown\diagup\text{N}\\ \text{N}\\ |\underset{\text{R}^1}{\diagup}\\ \text{CH}_2-\overset{\oplus}{\text{N}}\diagdown\text{R}^2\quad\text{X}^\ominus\\ |\\ \text{R}^3\end{array}$$

(a) *Diazotization reaction.*—The arylamines which are useful in preparing the dyes of this invention are of the formula Ar—NH$_2$ or Ar—N=N—Ar'—NH$_2$ in which Ar is phenyl or naphthyl group which is substituted with 0 to 3 substituents selected from the group consisting of Cl, Br, NO$_2$, CN, alkyl, C$_{1-4}$ alkoxy, CF$_3$, phenylcarbonyl, phenylsulfonyl, N,N-di- alkyl carboxamido and N,N-di-C$_{1-4}$ alkylsulfonamido, and Ar' phenylene, naphthylene or biphenylylene which is substituted with 0 to 2 substituents selected from the group consisting of alkyl and C$_{1-4}$ alkoxy groups.

Suitable arylamines of the formula Ar—NH$_2$ which are useful in preparing the monoazo dyes of this invention include aniline,
o-, m- and p-chloroaniline,
o-, m- and p-bromoaniline,
o-, m- and p-anisidine,
o-, m- and p-toluidine,
2,3-, 2,4-, 2,5-, 2,6-, 3,4- and 3,5-xylidine,
2,5-dichloroaniline,
3,4-dichloroaniline,
2-nitro-4-chloroaniline,
o-, m- and p-nitroaniline,
2-methyl-5-isopropylaniline,
2,4,6-trichloroaniline,
2,4,6-tribromoaniline,
3,5-dibromo-4-aminotoluene,
2,4-dibromoaniline,
2-trifluoromethyl-4-chloroaniline,
2-trifluoromethylaniline,
m- and p-aminodiphenylmethane,
o-, m- and p-ethylaniline,
2-isopropyl-5-methylaniline,
2,6-dichloro-4-nitroaniline,
4-aminobenzophenone,
2-methyl-4-nitroaniline,
2-chloro-5-nitroaniline,
p-cyanoaniline,
2-methoxy-5-nitroaniline,
4-amino-3,5-dibromobenzophenone,
2,4-dinitro-6-bromoaniline,
4-nitro-2-cyanoaniline,
2,4-dicyanoaniline,
3-chloro-4-cyanoaniline,
2-cyano-5-chloroaniline,
3,4-dicyanoaniline,
2,5-dicyanoaniline,
2-chloro-4-cyanoaniline,
2,4-dinitroaniline,
2-amino-5-nitroanisole,
3-nitro-4-amino-toluene,
2,4-dichloroaniline,
2,5-dichloro-4-nitroaniline,
2-cyano-4,6-dinitroaniline,
2-cyano-6-bromo-4-nitroaniline,
2-cyano-5-chloro-4-nitroaniline,
2-aminodiphenylsulfone,
4-aminodiphenyl sulfone,
2,5-diethoxyaniline,
2,5-dimethoxyaniline,
2-butoxy-5-methoxyaniline,
2-butyl-5-methoxyaniline,
o- and p-phenetidine,
o- and p-propylaniline,
o- and p-propoxyaniline,
2,4,5- and 2,4,6-trimethylaniline,
p-butylaniline,
2-phenylsulfonyl-4-nitroaniline,
2-N',N'-dimethylsulfamyl-4-nitroaniline,
2-benzoyl-4-nitroaniline,
2-chloro-4-N',N'-dimethylsulfamylaniline,
2,5-dichloro-4-N',N'-dimethylsulfamylaniline,
2,6-dinitro-4-N',N'-dimethylsulfamylaniline,
2,6-dibromo-4-nitroaniline,
1-naphthylamine, 2-naphthylamine,
6-methyl-2-naphthylamine,
5-nitro-2-naphthylamine,
4-nitro-1-naphthylamine,
2,4-dinitro-1-naphthylamine,
1-amino-2-methylnaphthalene, and
2-ethoxy-1-naphthylamine.
Aniline and p-toluidine are preferred.
Suitable azo arylamines of the formula Ar—N=N—Ar' which are useful in preparing the disazo dyes of this invention include aminoazobenzene,
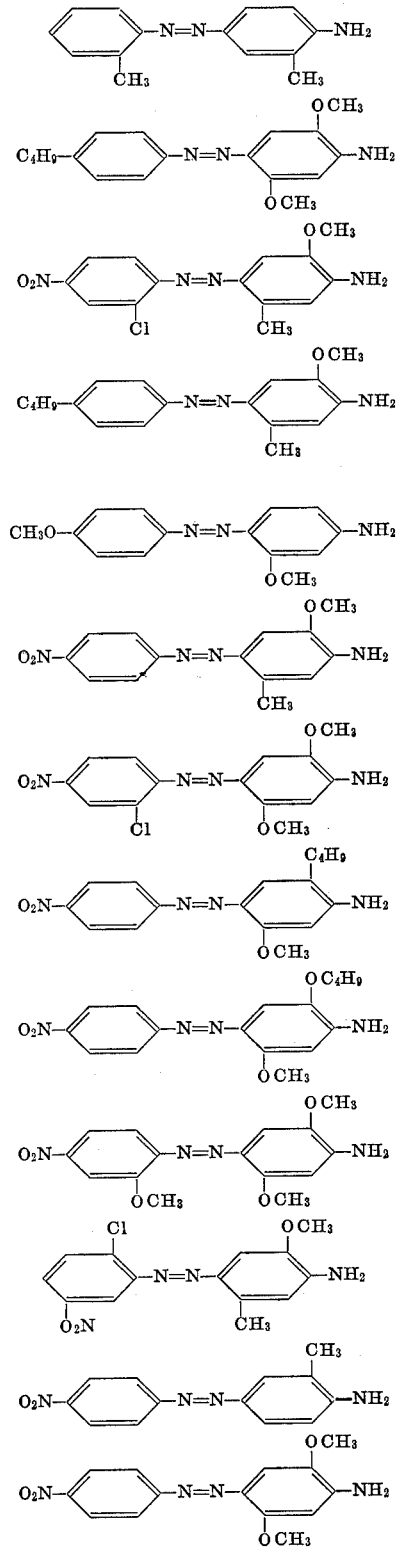
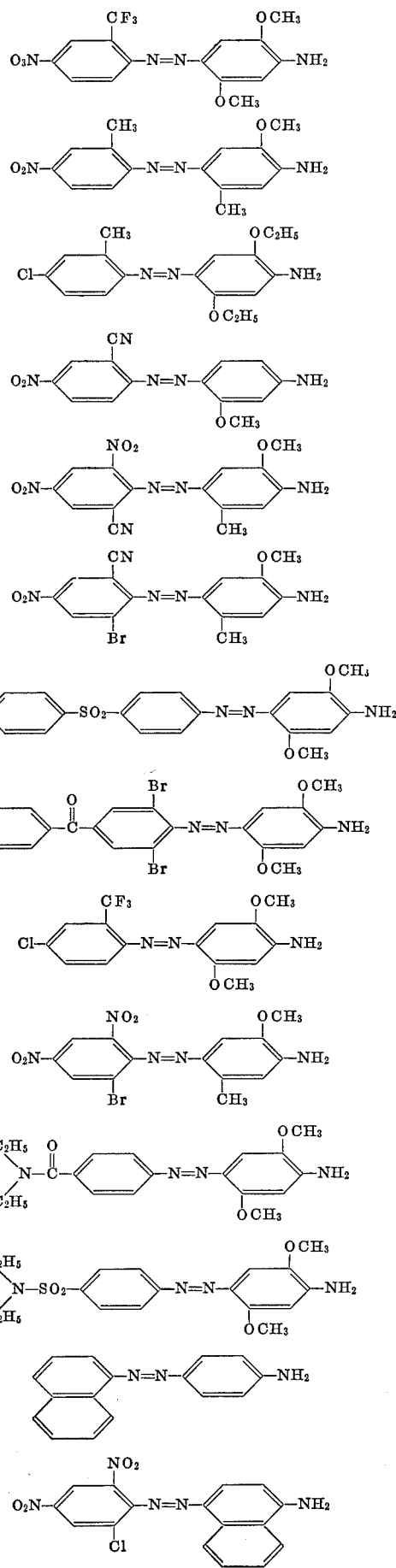

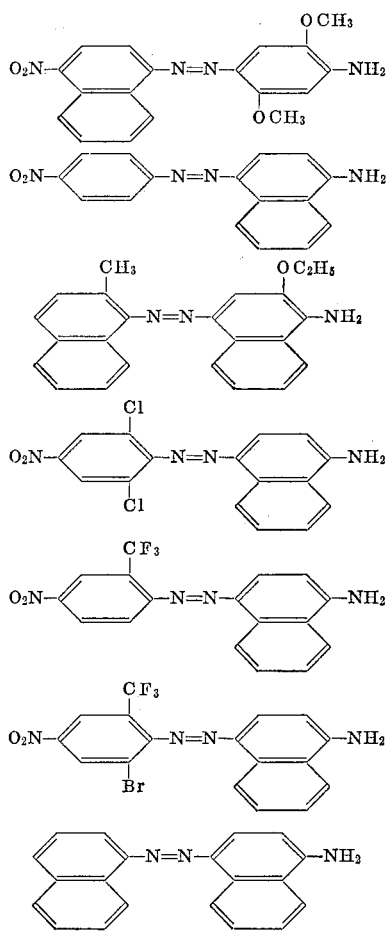

and

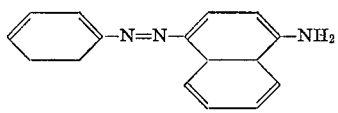

All of the above azo arylamines are readily prepared by conventional diazo chemistry. As is well known in the art, when preparing azo arylamines by diazotization of a highly electronegatively substituted aniline such as 2,4-dinitro-6-bromoaniline, 2,6-dichloro-4-nitroaniline, 4-benzoyl-2,6-dibromoaniline, 2,4-dinitro-6-cyanoaniline, 2,4-dinitro-6-chloroaniline or 2-cyano-6-bromo-4-nitroaniline, nitrosyl sulfuric acid is required.

The diazotization can be carried out by first preparing an aqueous mineral acid solution, preferably hydrochloric acid. The arylamine is then added, and the mixture is stirred until solution is complete. Ice is then added to reduce the temperature to about 25° to —5° C., followed by the addition of a slight excess of sodium nitrite while maintaining the temperature at about 25° to —5° C. A strong test for nitrous acid and acidity to Congo Red should be maintained throughout the diazotization. After all the nitrite has been added, the solution is agitated for an additional 10–30 minutes. When diazotization is completed, a filter aid may be added and the solution filtered to remove any unreacted starting material or tarry impurities.

At the end of the diazotization, the diazo should be coupled immediately to the pyrazolone to avoid losses due to diazo decomposition. If an unexpected delay occurs, the diazo should be cooled with ice to 5° C. until the pyrazolone solution is used in the coupling step. Just before the coupling reaction, the excess nitrous acid in the diazo solution is destroyed by addition of sulfamic acid.

(b) *Coupling reaction.*—The coupling components which are useful in preparing the cationic dyes of this invention are 3-substituted pyrazolones of the structure:

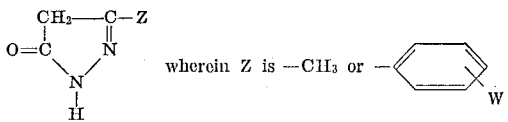

in which W is H, Cl, Br, $NO_2$, alkyl or $C_{1-4}$ alkoxy and is in the meta or para position. The prefered coupling components are 3-methyl-2-pyrazolin-5-one and 3-phenyl-2-pyrazolin-5-one. These 3-substituted pyrazolones are old compounds which are prepared by the reaction of hydazine with ethyl acetoacetate or ethyl benzoylacetate, respectively. Ethylbenzoylacetate is prepared by a crossed Claisen condensation of ethyl benzoate with ethyl acetate, in the presence of strong base, as illustrated below:

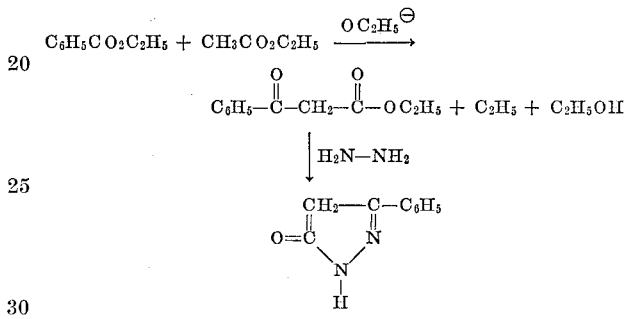

Substituted 3-phenyl-2-pyrazolin-5-ones are readily available by similar reactions, starting with ethyl acetate and a substituted ethyl benzoate, provided that the substituent does not interfere with the Claisen condensation or subsequent reaction with hydrazine. Non-interfering substituents include Cl, Br, $NO_2$, alkyl, and $C_{1-4}$ alkoxy groups in positions meta and para to the carboethoxy group.

A convenient method for carrying out the coupling reaction is by first adding the pyrazolone to water and stirring to obtain a smooth slurry. Sodium hydroxide is then added to yield a clear solution of the pyrazolone. During this procedure, the temperature is held at about 20° C. and the pH of the resulting solution is approximately 10. A small quantity of a nonionic surface-active agent may be added to the diazo solution, followed by the addition to the pyrazolone solution over a period of about 20 minutes, holding the temperature to about 5° to 25° C. In general a slight excess of pyrazolone coupling component is used over the diazo, but as in most all azo chemistry, the proportions of diazo to coupling component are approximately stoichiometric, that is, about mole for mole. The pH at the end of the addition will be in the range of about 1.5–2; a yellow precipitate of azo pyrazolone will form. Coupling is completed by raising the pH to 4–5.0 by the addition of sodium acetate; coupling should be complete in about 30–60 minutes at this latter pH. As coupling proceeds the slurry may become quite thick; water may be added as required to afford good mixing.

(c) *Formaldehyde and amine reaction.*—The formaldehyde used to prepare the dyes of this invention may be added as formaldehyde or an agent yielding formaldehyde such as paraformaldehyde or trioxane. The formaldehyde is most conveniently added as an aqueous solution. However, it may also be added in the vapor phase, as generated by heating paraformaldehyde or trioxane.

The secondary amines which are useful in the synthesis of the cationic dyes of this invention are of the formula $R^1$—NH—$R^2$ wherein $R^1$ and $R^2$ are alkyl or together with the attached nitrogen from an alicyclic ring of the structure:

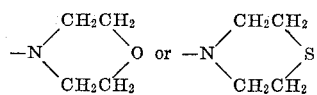

The preferred secondary amines are dimethylamine and diethylamine. Other suitable amines include methylethylamine, di-n-propylamine, dibutylamine, piperidine, morpholine and thiomorpholine.

Although the azo pyrazoline can be reacted first with formaldehyde and then with the amine, it is preferable to carry out the condensation with formaldehyde and amine as a single step. The reaction can be carried out at temperatures in the range of about 10–100° C. and preferably at 50–80° C. At least one mole of formaldehyde and one mole of amine should be used per mole of azo pyrazoline, and preferably an excess should be used, for example, two moles of formaldehyde and two moles of amine per mole of azo pyrazolone.

A convenient method for carrying out the condensation with formaldehyde and secondary amine is by first dissolving sodium hydroxide in water and gradually adding this solution to the azo pyrazolone slurry to raise the pH to 8.5±0.3. Then, a secondary amine sometimes conveniently handled as an aqueous solution, is added below the surface of liquid layer, followed by addition of formaldehyde, also conveniently as an aqueous solution. These additions are made with the reaction slurry at ambient temperature. The amine addition will cause the pH of the dye slurry to rise to 10.5–11.5, and will cause some dye to dissolve. After the addition of the formaldehyde, the pH of the reaction mass will be about 9.6–10.0. There will be about a 5° C. temperature rise due to the exothermic heat of reaction. If the pH at this point is greater than 10.4, hydrochloric acid should be added to adjust the pH to 10.0±0.4. The reaction mass is stirred at ambient temperature for one hour, then heated to 65–85° C. and held for two hours to attempt to force the reaction to completion.

If the dye base is appreciably soluble at a pH of 10.0±0.4 as in the case of monoazo dye bases, the pH should be lowered to 8.5±0.3, by the addition of hydrochloric acid, before isolating the dye base by filtration. The dye base product is filtered, washed with water to remove excess amine and formaldehyde, and dried at 70–75° C.

(d) *Quaternization reaction.*—The quaternizing reagents which are useful in the synthesis of the cationic dyes of this invention are of the formula $R^3$—X wherein $R^3$ is alkyl or

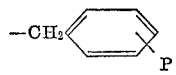

in which P is H, Cl, Br, $NO_2$, alkyl or $C_{1-4}$ alkoxy. The preferred quaternizing reagents are dimethylsulfate and diethylsulfate. Other suitable quaternizing reagents include dipropyl sulfate, dibutyl sulfate, methyl chloride, methyl bromide, n-butyl chloride, n-butyl bromide, the methyl and ethyl esters of benzenesulfonic acids, e.g. methyl tosylate and the like, benzyl chloride, benzyl bromide, o-bromobenzyl chloride, m-chlorobenzyl chloride, p-chlorobenzyl chloride, p-bromobenzyl chloride, and the like.

Quaternization of the dry, dye base may be effected in a solvent for the dye base such as chlorobenzene, isopropyl alcohol or dimethyl formamide under a nitrogen atmosphere. The quaternizing agent may be added to the dye base in the solvent at about 50–100° C. over about a 1 to 4 hour period. Quaternization of the dye base is also an exothermic reaction. The slow rate of addition will aid in maintaining the desired temperature as well as giving a coarser, crystalline product which will be easier to filter and wash. After all the quaternizing agent has been added, the temperature is held at about 50–100° C. for about 1–2 hours to complete the quaternization reaction. Alternatively, the quaternizing agent may all be added at once at about 25° C. and the reaction then gradually heated to about 50–100° C. and held at that temperature for about 1–2 hours to complete the quaternization reaction. The reaction mass is then cooled to about 20–25° C. and held at that temperature for at least one hour to aid complete dye crystallization prior to filtering. The cationic azo dye is isolated by filtration, washed with a suitable solvent such as chlorobenzene or isopropyl alcohol, and dried at 60–65° C. Instead of quaternizing the tertiary amine dye base in a solvent for the base in which the quaternary salt is essentially insoluble, the dye base may be quaternized in water in which it is essentially insoluble, but in which the product is quite soluble.

(2) Utility of the dyes

The cationic dyes of this invention may be used in a number of forms; one useful commercial form is dissolved in 70% aqueous glycolic acid. For example, a 25% dye solution can be prepared by adding 167 parts of crude, quaternized dye to 500 parts of 70% aqueous glycolic acid, heating the mixture to 50±3° C. for 1–2 hours, and allowing the solution to cool. This solution form finds particular utility in textile printing applications because of its ease of handling and non-specking properties. While this solution is mainly intended for printing applications, the more conventional powder form of the dyes also has utility in dyeing applications on acid-modified polyacrylic fibers where good lightfastness, and level-dyeing properties are desired. The dye may also be mixed with an anti-dusting oil and pulverized with boric acid.

In recent years standard polyacrylic, polyester and polyamide fibers have been acid-modified to make them dyeable with basic dyes. Relatively new formulations of acid-modified polyacrylic and polyamide fibers are being manufactured which are particularly designed for the important carpet market.

In general the cationic dyes of this invention have found utility in dyeing acid-modified fibers from the following five classes:

(1) Acid-modified acrylic fibers in which at least about 85% by weight of the polymer forming units are derived from acrylonitrile. Acid-modified acrylic fibers are composed of polyacrylonitrile homopolymers and copolymers which have been modified by an acidic group such as sulfoarylethylene, for example, vinylbenzenesulfonic acid or a water-soluble salt thereof, as described in U.S. Patents 2,837,500, 2,837,501 and 3,173,747. These fibers include the trade name fibers listed in the following table.

TABLE 1

| Fiber | Manufacturer | Country |
|---|---|---|
| "Acrilan" 16 | Chemstrand | U.S.A. |
| "Acrybel" | Fabelta | Belgium. |
| "Courtelle" | Courtaulds | U.K. |
| "Crylor" | Soc. Crylor | France. |
| "Dolan" | Suddeutsche Zellwolle | Germany. |
| "Dralon" | F. Bayer | Germany. |
| "Dralon" (New) | F. Bayer | Germany. |
| "Exlan" L | Exlan Ind | Japan. |
| "Leacryl" 16 | Acsa | Italy. |
| "Orlon" 42 | Du Pont | U.S.A. |
| "Orlon" Sayelle | Du Pont | U.S.A. |
| "Redon" F | Plurex-Werke | Germany. |
| "Tacryl" | Superfosfat | Sweden. |
| "Vonnel" | Shinko | Japan. |

(2) Acid-modified modacrylic fibers in which about 35–85% by weight of the polymer forming units are derived from acrylonitrile including "Verel" (Tennessee Eastman, U.S.A.) and "Dynel" (Union Carbide, U.S.A.);

(3) Acid-modified polyacrylonitrile fibers that have been treated with a flame retardant. Such fibers find particular utility in carpeting, curtains, draperies, upholstering and wearing apparel such as sweaters and dresses. A specific representative acid-modified acrylic fiber containing a flame retardant is disclosed in British Patent 1,007,-620 and a representative class of haloalkyl phosphate flame retardants which may be introduced as spinning additives are described in U.S. Patent 3,149,089. The novel dyes of the present invention show good build-up, light-fastness and dyeing properties on these fibers;

(4) Acid-modified polyamide fibers as illustrated by U.S. Patent 3,184,436;

(5) Acid-modified polyethylene terephthalate fibers as illustrated by U.S. Patent 3,018,272.

The cationic dyes of this invention may be used to dye acid-modified fibers using standard techniques for the particular fiber. In general, about 0.05–5% by weight of dye will be used in the dye bath based on the weight of the fiber depending upon the depth of shade desired. Colorless quaternary ammonium salt dye retarding agents may be used particularly in the case of cationic dyeable acrylic fibers. The amount of retarding agent to be used will vary depending upon the depth of shade desired. A very light shade requires a maximum concentration of retarder, for example about 2%, while medium to heavy shades require 0.5% to no retarding agent. Normally the dye will be essentially exhausted from the dye bath onto the fiber after about one to two hours. These dyes may also be used to prepare printing pastes in the conventional manner using standard formulations well known to those skilled in the art.

(3) Examples

The following examples, illustrating the preparation and utility of the novel cationic dyes of this invention, are given without any intention that the invention be limited thereto. All parts and percentages are by weight.

Example 1

This example illustrates the preparation of the monoazo, cationic dye of the structure:

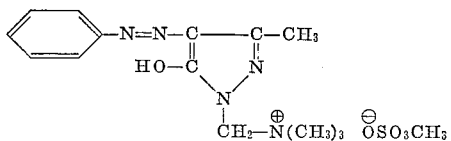

Aniline (18.6 parts) is added to 300 parts of water and ice containing 49.6 parts of 37% hydrochloric acid solution. With the temperature at −5° C., 14.1 parts of sodium nitrite are added rapidly as a 30% solution to prepare the aniline diazo. After stirring at about 0° C. for 15 minutes, the excess nitrous acid present is destroyed by the addition of a small amount of sulfamic acid. A solution of 3-methylpyrazolone is prepared by dissolving 19.6 parts of 3-methylpyrazolone in 500 parts of ice and water containing 8.0 parts of sodium hydroxide and 30 parts of sodium carbonate. The aniline diazo solution is added to the 3-methylpyrazolone solution causing a yellow precipitate of phenylazo-3-methylpyrazolone to form. The resulting pH of this slurry is 9.6. To this azo pyrazolone slurry are added 11.1 parts of formaldehyde as a 37% solution and 15 parts of dimethylamine as a 25% solution and the reaction mixture is allowed to stand for 48 hours at about 25° C. with occasional stirring. The tertiary amino dye base is isolated by filtration, washed with water and dried in a vacuum oven at 45° C.

26 parts of the tertiary amine dye base prepared above are added to 160 parts of anhydrous isopropyl alcohol. The resultig mixture is heated to 82° C. A clear, yellow solution is obtained at about 60° C. 26 parts of dimethyl sulfate are added gradually to the refluxing solution over about a 30 minute period, and then heating at reflux is continued for another one and one-half hour period. After cooling to room temperature and stirring overnight a well defined crystalline product is isolated by filtration, washed with isopropyl alcohol and dried in air at 50° C. 32.5 parts of the desired quaternized dye are obtained. This dye is extremely soluble in water and dyes "Orlon" acrylic fiber at the boil to a bright green-yellow shade.

Example 2

This example illustrates the prepaartion of the monoazo, cationic dye of the structure:

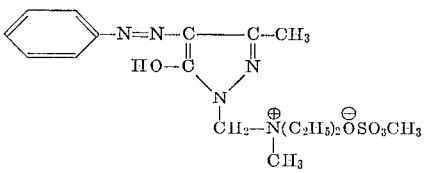

Diazotization of 46.5 parts (0.5 mole) of aniline and coupling to 3-methylpyrazolone are carried out in a manner similar to that outlined in Example 1. Seventy-three parts (1 mole) of diethylamine and 30 parts of formaldehyde, as a 37% aqueous solution, are added to the azo pyrazolone slurry. After stirring the slurry overnight, the reaction mass is heated to 40° C. and held at this temperature for one hour. The tertiary amino dye base is isolated by filtration, washed with water and dried at 55° C. in a vacuum oven to yield 139.5 parts. Quaternization of this dye base in isopropyl alcohol with dimethylsulfate gives the desired water soluble quaternary dye salt which has a maximum absorption in the visible spectrum at 412 millimicrons in an aqueous solution.

Example 3

This example illustrates the preparation of the monoazo, cationic dye of the structure:

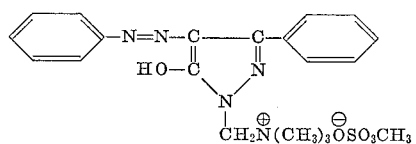

The diazotization of 18.6 parts of aniline is carried out essentially as in Example 1. A solution of 3-phenylpyrazolone is prepared by dissolving 35 parts of 3-phenylpyrazolone in 500 parts of water containing 8.8 parts of sodium hydroxide. After destroying excess nitrous acid in the diazo solution by the addition of sulfamic acid, the coupler solution of 3-phenylpyrazolone is added to the aniline diazo solution over a 15-minute period. Coupling to form a yellow azo pyrazolone is promoted by increasing the pH to 4.8 by the addition of 20 parts of anhydrous sodium acetate.

Coupling is complete when there is obtained a negative test for the diazo when spotting the dye slurry on spot paper with alkaline "R" salt solution. The pH of the dye slurry is adjusted to 8.0 by the addition of an aqueous solution of sodium hydroxide and 11.1 parts of formaldehyde as a 37% solution and 15 parts of dimethylamine as a 25% aqueous solution are added. Within an hour there is a noticeable change in the appearance of the yellow precipitate to a more orange color and the slurry becomes quite thick. After stirring the slurry all night at room temperature the product is isolated by filtration, washed with water and dried giving nearly a theoretical weight yield of the desired tertiary amine dye base.

Three parts of the above tertiary amine dye base are treated with 1.35 parts of dimethyl sulfate in 4 parts of isopropyl alcohol at 80–82° C. for about one-half hour. The desired quaternary dye salt crystallizes when the reaction mixture is diluted with an additional 16 parts of isopropyl alcohol. The dye salt is isolated by filtration, washed with isopropyl alcohol and dried in an air circulating oven at 50° C. to give 2.7 parts of dye. This dye shows a maximum absorption at 415 millimicrons when a dilute aqueous solution is scanned in a General Electric spectrophotometer. A thin layer chromatogram using silica gel as the absorbent shows that this quaternized dye has appreciably more affinity for the silica gel than the original tertiary amine base. This dye gives an attractive green-yellow shade slightly redder than the dye of Example 1 when dyed on "Orlon" acrylic fiber.

A somewhat higher yield of cationic dye is obtained when quaternization of the tertiary amine dye base with dimethyl sulfate is carried out in chlorobenzene solution instead of isopropyl alcohol. A rapid exothermic reaction takes place when 1.35 parts of dimethylsulfate are added to 3.0 parts of the tertiary amine base in 10 parts of chlorobenzene at 70° C. The desired quaternary dye salt crystallizes from the hot solution within a few seconds after the addition of the dimethyl sulfate. After further dilution with 10 parts of chlorobenzene and cooling to 25° C., the product is isolated by filtration, washed with chlorobenzene, and dried in air at 70° C. to obtain 3.5 parts of the water-soluble cationic dye.

Example 4

This example illustrates the preparation of the monoazo, cationic dyes of the structure

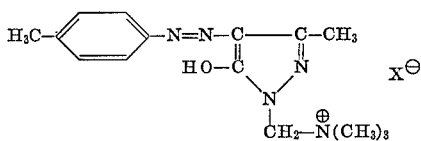

in which X is $OSO_3CH_3$ or $OSO_2C_6H_4CH_3$.

(a) 53.5 parts of para-toluidine (0.5 mole), heated to about 50° C. to melt the material, are added to 700 parts of water containing 48 parts of hydrochloric acid. Ice is added to reduce the temperature to −5° to 0° C. and 36 parts sodium nitrite as a 30% solution are added rapidly to the p-toluidine solution to form the diazo. After stirring at 0° C. for approximately 15 minutes, the small excess of nitrous acid present is destroyed by the addition of sulfamic acid.

A coupler solution containing 52 parts of 3-methylpyrazolone and 21.5 parts of sodium hydroxide in 500 parts of water is added to the p-toluidine diazo solution. The pH is adjusted to 5 by the addition of 40 parts of sodium acetate in order to promote the coupling and form the water insoluble yellow dye. The pH of the slurry is then adjusted to 8.5 by the addition of dilute sodium hydroxide and 45 parts of dimethylamine as a 25% aqueous solution and 30 parts of formaldehyde as a 37% aqueous solution are added. These reactants tended to make the dye dissolve and then reprecipitate in a different physical form as the tertiary amine base. After stirring the slurry overnight at about 25° C. the precipitate is isolated by filtration, washed with water and dried in vacuum ta 60° C. An excellent yield (130 parts) of the desired tertiary amine dye base is obtained.

54.6 parts (0.2 mole) of the tertiary amine dye base are dissolved in 300 parts of monochlorobenzene by warming to 60° C. The temperature of the solution is increased to 90° C. and 30.3 parts (0.24 mole) of dimethyl sulfate are added dropwise to the solution over a one hour period. The quaternary salt crystallizes from the solution as it forms. After heating for an additional one hour period, the cationic dye slurry is cooled to about 25° C., and the dye filtered, washed with monochlorobenzene and anhydrous isopropyl alcohol and dried in an air circulating oven at 70° C. This dye has a sharp absorption peak in the visible spectrum at 420 millimicrons when measured in aqueous solution with a General Electric spectrophotometer (Model No. 7015E30G102). It dyes "Orlon" acrylic fiber in attractive green-yellow shades.

(b) Procedure (a) is repeated except that methyl-p-toluene sulfonate is used in the same mole proportion in place of dimethyl sulfate during the quaternizing step. A crystalline product with excellent water solubility is obtained.

Example 5

This example illustrates the preparation of the disazo, cationic dyes of the structure:

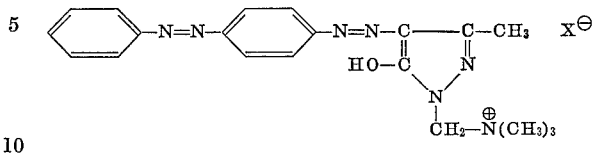

in which X is $OSO_3CH_3$, $OSO_2C_6H_4CH_3$, Cl or $OSO_3H$.

(a) 187 parts (0.6 mole) of aminoazobenzene hydrochloride are dispersed and partially dissolved in 1800 parts of water containing 44.5 parts of hydrochloric acid. With the temperature adjusted to 21° C., 44.7 parts of sodium nitrite are added over a 30-minute period as a 30% aqueous solution. After an additional 20-minute period the diazo solution is filtered.

A solution containing 60.3 parts of 3-methylpyrazolone is prepared by adding the pyrazolone to 1200 parts of water containing 24 parts of sodium hydroxide. The pyrazolone solution is added to the diazo solution from which excess nitric acid has been removed by the addition of sulfamic acid. The pH is adjusted to 4.2 by the addition of 150 parts of anhydrous sodium acetate. At this pH coupling proceeds rapidly to form a yellow-orange precipitate of the diazo pyrazolone.

The pH of the slurry is then increased to 8.5 by the addition of dilute sodium hydroxide solution and 54 parts (1.2 mole) of dimethylamine, as a 25% aqueous solution, and 36 parts (1.2 mole) of formaldehyde, as 37% aqueous solution, are added.

The resulting dye slurry having a pH of about 10 is heated to 50 to 55° C. with good agitation and held for a period of 2 hours at this temperature range. The dye gradually changes to a reddish-orange essentially water-insoluble product. The tertiary amine dye base is isolated by filtration, washed with water and dried in vacuum at 55° C. The yield of dye base is 89% of the theoretical yield based oin the starting aminoazobenzene hydrochloride.

30 parts (0.0286 mole) of the tertiary amine base are added to 150 parts of monochlorobenzene and the mixture is heated to 90° C. Complete solution occurs at about 60° C. Dimethylsulfate (34.3 parts) is dropped in gradually over about a one-hour period at 90 to 95° C. to form the quaternary salt which is essentially insoluble in the chlorobenzene. The reaction is noticeably exothermic. The reaction mass is cooled to about 25° C., and the dye isolated by filtration, washed with 75 parts of chlorobenzene and then 20 parts of isopropyl alcohol, and dried at 50° C. in an air circulating oven. An excellent yield of the quaternary dye is obtained. This dye dissolves readily in water to give a clear solution which dyes polyacrylic fibers in an attractive yellow shade. Aqueous solutions of this dye show a maximum absorption in the visible spectrum at 440 millimicrons.

(b) Procedure (a) above is repeated except that methyl-p-toluene sulfonate is used instead of dimethylsulfate. The resulting cationic dye, isolated as the methyl-p-toluene sulfate salt, has excellent water solubility.

(c) 30 parts of the tertiary amine base prepared by procedure (a) above are slurried in 200 parts of water at about 25° C. and a total of 31 parts of dimethylsulfate are added over about a one-half hour period. The reaction mixture is stirred overnight at about 25° C. The volume is then increased to 600 parts with water, heated to 50° C. and filtered to remove any unreacted or water-insoluble material. 37% aqueous hydrochloric acid (9.4 parts) are added to reduce the pH to 0.8. Common salt is then added to provide a concentration of about 15% in the dye solution which, after stirring approximately one-half hour, causes the dye to crystallize in shiny gold platelets. These are removed by filtration and dried, to give dye in equivalent yield and the same shade on "Orlon" acrylic fiber as that made by the chlorobenzene route. The dye isolated in this case is predominantly the chloride salt.

(d) Following procedure (c) above, sulfuric acid can be used in place of hydrochloric acid, and ammonium sulfate can be used in place of common salt in order to cause the dye to crystallize predominantly as the acid sulfate salt.

Example 6

This example illustrates the preparation of the diazo cationic dye of the structure:

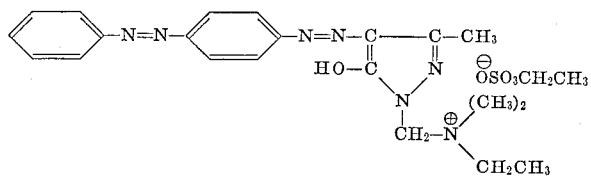

The general procedure of Example 5(a) is repeated except that diethylsulfate is used in place of dimethylsulfate. A well defined cationic crystalline product of the above structure is obtained in excellent yield.

Examples 7 to 21

Following the general procedure outlined in Example 5(a), additional cationic dyes of the structure:

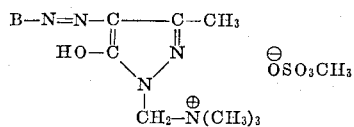

in which B is as designated in Table 2, have been prepared with the following results.

TABLE 2

| Example: | B | Comments |
|---|---|---|
| 7 | H₃C—(2-CH₃ phenyl)— | Yellow. |
| 8 | Cl—(phenyl)— | Green-yellow $\lambda_{max}$ 415 m$\mu$. |
| 9 | (2,4-diCl phenyl)— | Green-yellow. |
| 10 | (4-NO₂ phenyl)— | Green-yellow $\lambda_{max}$ 403 m$\mu$. |
| 11 | CH₃O—(phenyl)— | Yellow $\lambda_{max}$ 435 m$\mu$. |
| 12 | O₂N—(3-Cl phenyl)— | Yellow. |
| 13 | (2,5-diCH₃ phenyl)— | Green-yellow. |
| 14 | (naphthyl)— | Red-yellow. |
| 15 | (2-CH₃ phenyl)—N=N—(2-CH₃ phenyl)— | Red-yellow. |
| 16 | O₂N—(3-Cl phenyl)—N=N—(2-OCH₃, 5-CH₃ phenyl)— | Red. |
| 17 | O₂N—(phenyl)—N=N—(2-OCH₃, 5-CH₃ phenyl)— | Reddish-orange. |

TABLE 2.—Continued

| Example | B | Comments |
|---|---|---|
| 18 | $O_2N-\underset{Cl}{\underset{|}{C_6H_3}}-N=N-\underset{OCH_3}{\underset{|}{C_6H_2}}-OCH_3$ (with OCH₃ substituents) | Red. |
| 19 | $CH_3O-C_6H_4-N=N-\underset{OCH_3}{\underset{|}{C_6H_2}}-OCH_3$ | Orange. |
| 20 | $C_6H_5-N=N-(naphthyl)$ | Orange. |
| 21 | $O_2N-C_6H_4-N=N-(naphthyl)$ | Red. |

These dyes in general show good to excellent lightfastness on acid-modified polyacrylic fibers.

Example 22

The dye of Example 5(a) is used to dye various acid-modified fibers using the following procedures. In these procedures, the dye concentrations are for standardized dye. The standardized dye is prepared by finely pulverizing approximately 70 parts of dry, crude dye with approximately 260 parts of boric acid and 5 parts of an anti-dusting oil.

*Procedure A.*—The aqueous dye bath contains the following components in the indicated percentages based on the fiber weight:

0.5% glacial acetic acid,
10% anhydrous sodium sulfate,
0.5% condensation product of one mole of oleyl alcohol with 20 moles of ethylene oxide as non-ionic surfactant,
0 to 2% $C_{12}$ alkyltrimethyl ammonium bromide The dye is dissolved in the dye bath by first dissolving in hot water with 0.5 to 1 part of glacial acetic acid per part of dye. The other ingredients are then added to give a dye bath of the above composition. The fiber is introduced into the dye bath at 120° F. and the bath is gradually heated to the boil by raising the temperature 1 to 2° F. per minute. The dye bath is circulated to assure even distribution of dye solution around the fiber. Dyeing is continued for 1.5 hours after which the dye is essentially exhausted from the dye bath on to the fiber.

*Procedure B.*—The aqueous dye bath contains the following components in the indicated percentages based on fiber weight.

1% glacial acetic acid,
0.5% sodium acetate,
1% Du Pont's "Duponol" D mixed sodium long-chain alcohol sulfates as dyeing assistant,
0–6% Tennessee Eastman's "Verel" dyeing assistant, and
0.1–3% dye.

The fiber is introduced into the dye bath at 120° F. and the bath is gradually heated to 160° F. by raising the temperature 1–2° F. per minute. Dyeing is continued at this temperature for 1.5 hours with good circulation of the dye bath. The dyed fibers are then dried at 270° F. for 15 minutes to reluster the fiber.

*Procedure C.*—The aqueous dye bath contains the following components in the indicated percentages based on the fiber weight:

0.5–1% glacial acetic acid in an amount necessary to provide a pH of 4.5–5;
10% an hydrous sodium sulfate,
1% condensation product of one mole of oleyl alcohol with 20 moles of ethylene oxide as non-ionic surfactant, and
0.5–3% dye.

The dyeing is carried out in the manner of Procedure A.

*Procedure D.*—An aqueous bath is made up containing 1% Du Pont's Alkanol CN amphoteric surfactant as dyeing assistant and 0.5–1% tetrasodium pryophosphate based on the fiber weight. To this bath is added sufficient monobasic sodium phosphate to give a pH of 6. The fibers are then introduced into the bath at 80° F. and held at that temperature for 10 minutes. Dye (0.1–3% based on the fiber weight) is then added and the temperature is maintained at 80° F. for an additional 10 minutes. The temperature is then raised at the rate of 2° F. per minute to the boil (208° F.) and held at that temperature for one hour.

*Procedure E.*—The aqueous dye bath contains the following components in the indicated percentages based on the fiber weight:

1% glacial acetic acid,
1% condensation product of one mole of oleyl alcohol with 20 moles of ethylene oxide as non-ionic surfactant,
5 grams per liter of Du Pont's "Latyl" Carrier A, and
0.1–3% dye.

The dyeing is carried out in the manner of Procedure A.

After each of the above procedures, the dye fabric is rinsed, washed with soap and dried in the normal manner before testing. The dye fibers are tested for lightfastness using Test 16E–1964 (Xenon light Fade-Ometer test) of the American Association of Textile Chemists and Colorists (A.A.T.C.C.). The results are recorded for three dye concentrations representing light, medium and heavy yellow shades. The fibers are identified in Table 3 by reference to the previously mentioned classes. The rating system used to report lightfastness in Table 3 is as follows:

5—no change                D—duller
4—slightly changed         G—greener
3—noticeably changed       R—redder
2—considerably changed     W—weaker
1—much changed Ratings of 3 to 5 are commercially acceptable.

TABLE 3—LIGHTFASTNESS

| Fiber type | Class | Dyeing procedure | Dye conc., percent | Assistant or retarder conc., percent | Fadeometer hours | | |
|---|---|---|---|---|---|---|---|
| | | | | | 40 | 80 | 160 |
| "Acrilan" 16 | 1 | A | 0.1 | 2.0 | | 3-2 W | 2 W |
| | | | 1.0 | 1.5 | | 4-3 W | 3 W |
| | | | 3.0 | 0 | | 5-4 W | 4 W |
| "Courtelle" | 1 | A | 0.1 | 2.0 | 4 W | 4-3 W | |
| | | | 1.0 | 1.5 | 5 | 5-4 W | |
| | | | 3.0 | 0 | 5 | 5-4 W | |
| "Crylor" | 1 | A | 0.1 | 2.0 | 3 W | 3-2 W | |
| | | | 1.0 | 1.5 | 5-4 D | 4 DW | |
| | | | 3.0 | 0 | 5-4 D | 4 DW | |
| "Orlon" 42 | 1 | A | 0.1 | 6.0 | 4-3 W | 3 W | |
| | | | 1.0 | 5.0 | 5 | 5-4 W | |
| | | | 3.0 | 3.0 | 5 | 5-4 W | |
| "Verel" | 2 | B | 0.1 | 0 | 2 DW | 2-1 DW | |
| | | | 1.0 | 3.0 | 3-2 DW | 2 DW | |
| | | | 3.0 | 6.0 | 4 DW | 4-3 DW | |
| Polyacrylic | 3 | C | 0.1 | | 3 DW | 3-2 DW | |
| | | | 1.0 | | 5-4 DW | 4 DW | |
| | | | 3.0 | | 5-4 DW | 4 DW | |
| Nylon | 4 | D | 0.1 | | 3-2 W | 2 W | |
| | | | 1.0 | | 4-3 RD | 3 RD | |
| | | | 3.0 | | 4 RD | 4-3 RD | |
| Polyester | 5 | E | 0.1 | | 2 RW | 2-1 RW | |
| | | | 1.0 | | 4-3 RW | 3 RW | |
| | | | 3.0 | | 5-4 R | 5-4 R | |

The following data were obtained in additional standard A.A.T.C.C. tests using 1% dyeings on Orlon except where otherwise noted.

TABLE 4

| Test | Conditions | Rating |
|---|---|---|
| Dyebath pH stability | pH 3-6.5 | 5 |
| Dry heat stability | 15 minutes at 325° F | 4 W |
| Steaming stability | 30 minutes at 10 p.s.i | 5 |
| Removal by stripping | Sodium chlorite | (1) |
| Removal by stripping | Sodium hypochlorite | (2) |
| High temp. dyeing stability | {225° F. (test) / 208° F. (control)} | 4 G |
| Flare | Fluorescent light (test) v. sunlight (control) | 5 |
| Fastness to durable press | 1% dyeing on "Orlon"/ "Avril" blend treated (test) vs. untreated (control) | 4 R-3 D |

1 Pale cream.
2 Completely removed.

EXAMPLE 23

In the same manner as Example 22, various fibers are dyed with other dyes prepared in the preceding examples, and tested for lightfastness. The dyeings are of medium depth using approximately 0.5% crude dye base on the weight of the fiber. The following results are obtained.

TABLE 5.—LIGHTFASTNESS

| Dye of Example | Fiber Type | Class | Dyeing procedure | Fadeometer hours | | |
|---|---|---|---|---|---|---|
| | | | | 40 | 80 | 120 |
| 1 | "Orlon" 42 | 1 | A | 5 | | |
| 3 | do | 1 | A | | 5 | |
| 4(a) | do | 1 | A | | 4 | |
| 7 | do | 1 | A | | 5-4 | |
| 7 | Nylon | 4 | D | 3 | | |
| 8 | "Orlon" 42 | 1 | A | | 4 | |
| 9 | do | 1 | A | | 5 | |
| 10 | do | 1 | A | | 5 | |
| 11 | do | 1 | A | | 4 | |
| 13 | do | 1 | A | | | 3 |
| 14 | do | 1 | A | | | 3 |
| 15 | do | 1 | A | | 4 | |
| 16 | do | 1 | A | 4 | | |
| 17 | do | 1 | A | 3 | | |
| 17 | Polyacrylic | 3 | C | 4 | 3 | |
| 18 | "Orlon" 42 | 1 | A | 5-4 | | 3 |
| 19 | do | 1 | A | 2 | | |
| 21 | do | 1 | A | 3 | | |

These dyes in general show good to excellent lightfastness on acid-modified fibers.

Example 24

The crude cationic dyes of Examples 4(a), 7 and 8 are each used to prepare each of the following printing formulations.

| Ingredients | Formulation, parts | | |
|---|---|---|---|
| | A | B | C |
| Dye | 1.0 | 1.0 | 1.0 |
| Glacial acetic acid | 5.0 | | |
| Citric acid | 2.0 | | |
| Urea | | 5.0 | 10.0 |
| Kromfax solvent (Union Carbide's HOCH$_2$CH$_2$S—CH$_2$CH$_2$OH) | | 5.0 | 5.0 |
| Neutralized 5% "Polygum" 260 | 60.0 | 60.0 | 60.0 |
| Water | 32.0 | 29.0 | 14.0 |
| Tanalid 004 Sp. (Tanatex Chemical Corp.) | | | 10.0 |

Print paste formulation A is prepared by dissolving the dye in 20 parts of water and adding 2 parts of citric acid and 5 parts of glacial acetic acid. This dye solution is added to 60 parts of neutralized 5% "Polygum" 260 thickener, prepared by dissolving 5 parts of Polymer Industries' "Polygum" 260 modified Locust Bean gum thickener in 95 parts of water and neutralizing with a few drops of glacial acetic acid, and sufficient water is added to make 100 parts of print paste. The other print paste formulations are prepared in a similar manner.

These print pastes are printed from an itaglio engraved roller onto "Orlon" 42 piece goods and cationic dyeable polyester piece goods. Additional printings are made at one-fourth reductions by mixing 25 parts of the above print pastes and 75 parts of printing reduction thickeners prepared like formulations A, B and C, but without the dyes. Each of the prints are dried at 170° F. for 2 minutes in a flue dryer and developed by three different techniques:

(1) cottage steaming for 1 hour at 5 lb./in.$^2$ pressure,
(2) rapid aging for 20 minutes using super heated steam at 220° F., and
(3) dry heating for 5 minutes at 325° F.

After development each printed sample is rinsed, soaped for 5 minutes at 140° F. in a bath containing 0.07 g./l. of the condensation product of one mole of oleyl alcohol with 70 moles of ethylene oxide, rinsed again, and dried.

All the dyes show good development by all three formulations when developed by cottage steaming. The dyes of Examples 4(a) and 8 are green-yellows and the dye of Example 7 is a medium shade of yellow. When developed by rapid aging, formulation (C) gives the best development in all cases. When developed by dry heating, the shades are slightly redder and weaker than when developed by cottage steaming. All prints are speck free indicating that the dyes have excellent solubility in the print pastes.

Example 25

The crude cationic dyes of Examples 4(a) and 9 are prepared as 25% solutions in glycolic acid. These solutions are added to "Polygum" 260 to make print pastes as follows:

| | Parts |
|---|---|
| Dye solution 25% | 6.0 |
| "Polygum" 260 (5% solution) | 60.0 |
| Water | 36.0 |

These print pastes are printed on "Orlon" 42 piece goods and cationic dyeable polyester piece goods. Additional printings are made at one-tenth reductions by mixing 1 part of the above print paste with 9 parts of printing reduction thickener prepared like the print paste, but without the dye. Samples of each of the printings are developed by three different techniques: (1) cottage steaming, (2) rapid aging, and (3) dry heating.

The cottage steaming development gives the best prints; they have deeper shades and good brightness. Rapid age development gives slightly weaker prints, but good brightness. The dye of Example 9 is noticeably greener than the dye of Example 4(a).

Although the invention has been described and exemplified by way of specific embodiments, it is not intended that it be limited thereto. As will be apparent to those skilled in the art, numerous modifications and variations of these embodiments can be made without departing from the spirit of the invention.

What is claimed is:
1. Cationic dye of the structure:

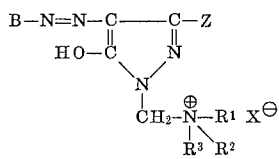

wherein B is Ar— or Ar—N=N—Ar'— in which
Ar is phenyl or naphthyl which is substituted with 0 to 3 substituents selected from the group consisting of Cl, Br, $NO_2$, CN, alkyl, alkoxy, $CF_3$, phenylcarbonyl, phenylsulfonyl, N,N-di-alkyl carboxamido and N,N-di-alkyl sulfonamido, and
Ar' is phenylene, naphthylene or biphenylylene which is substituted with 0 to 2 substituents selected from the group consisting of alkyl and alkoxy;
Z is —$CH_3$ or

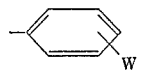

in which W is H, Cl, Br, $NO_2$, alkyl or alkoxy and is in the meta or para position:
each of $R^1$ and $R^2$ is alkyl or $R^1$ and $R^2$ together with the attached nitrogen are piperidino, morpholino or thiomorpholino;
$R^3$ is alkyl or

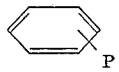

in which P is H, Cl, Br, $NO_2$, alkyl or alkoxy;
X is Cl, Br, alkylsulfate, $HSO_4$ or

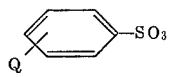

in which Q is H, alkyl or alkoxy,
with each alkyl and alkoxy group recited above having 1 to 4 carbon atoms.

2. The cationic dye of claim 1 which has the structure:

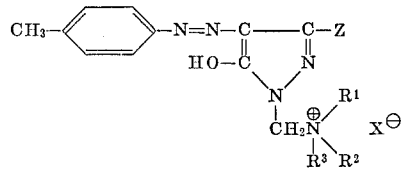

3. The cationic dye of claim 2 in which Z is —$CH_3$.
4. The cationic dye of claim 3 which has the structure:

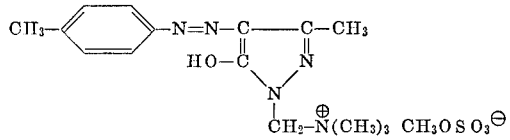

5. The cationic dye of claim 1 which has the structure:

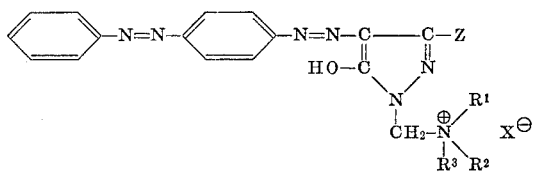

6. The cationic dye of claim 5 in which Z is —$CH_3$.
7. The cationic dye of claim 6 which has the structure:

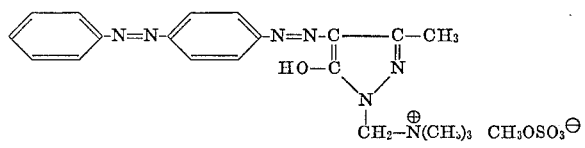

8. The cationic dye of claim 1 which has the structure:

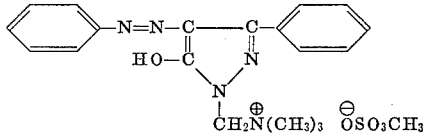

9. The cationic dye of claim 1 which has the structure:

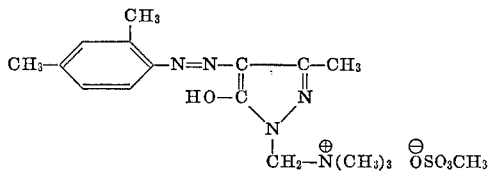

References Cited
UNITED STATES PATENTS

| 2,853,481 | 9/1958 | Strobel et al. | 260—162X |
| 3,152,114 | 10/1964 | Siegel et al. | 260—160X |
| 3,324,105 | 6/1967 | Hanke et al. | 260—162X |
| 3,341,513 | 9/1967 | Wegmuller et al. | 260—160X |
| 3,449,317 | 6/1969 | De Montmollin | 260—163X |

FLOYD D. HIGEL, Primary Examiner

U.S. Cl. X.R.

8—4, 41; 117—138.8; 260—37, 41, 155, 162, 163, 196, 198, 205, 206, 207.1, 310